United States Patent
Jin et al.

(10) Patent No.: US 10,859,849 B2
(45) Date of Patent: Dec. 8, 2020

(54) AUTOSTEREOSCOPIC THREE-DIMENSIONAL DISPLAY DEVICE

(71) Applicant: LG Display Co., Ltd., Seoul (KR)

(72) Inventors: You-Yong Jin, Seoul (KR); ByungJoo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/295,462

(22) Filed: Oct. 17, 2016

(65) Prior Publication Data

US 2017/0123219 A1    May 4, 2017

(30) Foreign Application Priority Data

Oct. 30, 2015   (KR) .................. 10-2015-0152113

(51) Int. Cl.
*G02B 27/22*   (2018.01)
*G02B 30/27*   (2020.01)
(Continued)

(52) U.S. Cl.
CPC ....... *G02B 30/27* (2020.01); *G02F 1/133512* (2013.01); *H04N 13/305* (2018.05);
(Continued)

(58) Field of Classification Search
CPC ..... H04N 13/04; H04N 13/0404–0406; H04N 13/0409; H04N 13/0497; H04N 13/0239;
(Continued)

(56) References Cited

U.S. PATENT DOCUMENTS 6,545,658 B2 *   4/2003   Ohta ................. G02F 1/134363
                                                                 345/87
7,471,367 B2 *   12/2008  Son .................. G02F 1/134363
                                                                 349/139
(Continued)

FOREIGN PATENT DOCUMENTS

CN    101750779 A    6/2010
CN    103309089 A    9/2013
(Continued)

OTHER PUBLICATIONS

The State Intellectual Property Office of the People's Republic of China, First Office Action, CN Patent Application No. 201610966387. 5, dated Sep. 3, 2018, 18 pages.

*Primary Examiner* — Stephone B Allen
*Assistant Examiner* — Jyotsna V Dabbi
(74) *Attorney, Agent, or Firm* — Fenwick & West LLP

(57) ABSTRACT

The disclosure relates to an autostereoscopic 3D display device for minimizing luminance difference in a view as well as a luminance difference between views. The 3D display device includes a display panel including pixels and a black matrix including openings exposing portions of the pixels, each of the pixels including a pixel electrode including a plurality of first fingers and a common electrode including a plurality of second fingers disposed between the first fingers, and a 3D optical plate disposed on a front surface or a rear surface of the display panel. At least two adjacent to each other in a horizontal direction have different shapes exposed by the plurality of openings.

9 Claims, 11 Drawing Sheets

(51) Int. Cl.
*G02F 1/1335* (2006.01)
*H04N 13/31* (2018.01)
*H04N 13/317* (2018.01)
*H04N 13/305* (2018.01)
*G02F 1/29* (2006.01)

(52) U.S. Cl.
CPC ........... *H04N 13/31* (2018.05); *H04N 13/317* (2018.05); *G02F 1/29* (2013.01)

(58) Field of Classification Search
CPC ........... H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 9/3197; H04N 9/3105; H04N 13/305; H04N 13/317; H04N 13/31; G02B 27/22; G02B 27/2214; G02B 27/2228; G02B 27/2257; G02B 27/2235; G02B 27/225; G02B 27/2264; G02B 27/017; G02B 27/26; G02B 30/27; G03B 35/00–12; G03B 35/20; G03B 31/06; G03B 31/00; G02F 1/133512; G02F 1/29

USPC ...... 359/462–464, 466; 348/42–60; 353/7–9; 349/8–9, 15
See application file for complete search history.

(56) References Cited

U.S. PATENT DOCUMENTS

| | | | | |
|---|---|---|---|---|
| 8,665,195 | B2* | 3/2014 | Tasaka | G02F 1/133707 345/613 |
| 8,797,371 | B2* | 8/2014 | Toyotaka | G09G 3/003 345/102 |
| 9,846,327 | B2* | 12/2017 | Huh | G02F 1/133512 |
| 2010/0134728 | A1 | 6/2010 | Kim et al. | |
| 2013/0235315 | A1 | 9/2013 | Ito et al. | |
| 2014/0063396 | A1 | 3/2014 | Lee et al. | |
| 2014/0152927 | A1* | 6/2014 | Watanabe | G02F 1/133512 349/15 |
| 2015/0015686 | A1 | 1/2015 | de la Barré et al. | |
| 2017/0169779 | A1 | 6/2017 | Song et al. | |

FOREIGN PATENT DOCUMENTS

| | | | |
|---|---|---|---|
| CN | 103635950 A | 3/2014 | |
| CN | 104221372 A | 12/2014 | |
| CN | 104865737 A | 8/2015 | |
| EP | 0791847 A1 * | 8/1997 | ......... G02B 27/2214 |

* cited by examiner

< BM CD = 0um >

< BM CD = -2um >

< BM CD = +2um >

AUTOSTEREOSCOPIC THREE-DIMENSIONAL DISPLAY DEVICE

CROSS-REFERENCE TO RELATED APPLICATIONS

This application claims the benefit of Korean Patent Application No. 10-2015-0152113 filed on Oct. 30, 2015, which is hereby incorporated by reference as if fully set forth herein.

BACKGROUND

Field of Technology

The present disclosure relates to an autostereoscopic three-dimensional (3D) display device.

Discussion of the Related Art

Stereoscopic image display devices are categorized into a stereoscopic 3D display technique and an autostereoscopic 3D display technique, and two the techniques are being used. The stereoscopic 3D display technique are categorized into a polarization stereoscopic 3D display technique, which changes polarization of a binocular disparity image to display an image in a direct-view type display device or a projector and realizes a stereoscopic image by using polarized glasses, and a shutter stereoscopic 3D display technique that temporally divides and displays a binocular disparity image and realizes a stereoscopic image by using shutter glasses. The autostereoscopic 3D display technique generally realizes a stereoscopic image by using a 3D optical plate such as a parallax barrier and a lenticular lens.

In the autostereoscopic 3D display technique, the 3D optical plate is disposed on a front surface or a rear surface of a display panel, and a viewing zone is formed at an optimal viewing distance by appropriately controlling light from each pixel of the display panel. The viewing zone may include a plurality of views. Since each of the plurality of views has a diamond shape, the plurality of views may be referred to as view diamonds. A width of each of the plurality of views may be set to a width equal to or less than an interval between two eyes of a user in order for the eyes of the user to see another image.

A black matrix for dividing pixels is provided between adjacent pixels in the display panel, and due to a process error of the black matrix, a luminance difference (LD) occurs between views. In order to solve such a problem, a view overlap method in which a lens or a barrier of a 3D optical plate is disposed to be inclined by a certain angle with respect to the display panel and the views overlap each other by a certain interval has been proposed. The view overlap method decreases a luminance difference between the views, but 3D crosstalk increases due to an overlap of the views. The 3D crosstalk represents that a plurality of view images are seen to overlap each other by eyes of a viewer. As the 3D crosstalk increases, a viewer feels inconvenience in viewing a 3D image, and it is difficult to express a sufficient depth of a 3D image. Therefore, it is required to develop a method for decreasing a luminance difference between views without using the view overlap method.

Moreover, an area where luminance is relatively bright and an area where luminance is relatively dark occurs in each pixel due to arrangement of a common electrode and a pixel electrode of each pixel. In this case, a view image where an area which is bright in luminance and an area which is dark in luminance are accumulated may be displayed on a view, and for this reason, a luminance difference occurs in the view. When the luminance difference occurs in the view, a user perceives the luminance difference depending to a position at which eyes of the user are located in the view.

SUMMARY

Accordingly, the present disclosure is directed to provide an autostereoscopic three-dimensional (3D) display device that substantially obviates one or more problems due to limitations and disadvantages of the related art.

An aspect of the present disclosure is directed to provide an autostereoscopic 3D display device for minimizing a luminance difference in a view as well as a luminance difference between views.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an autostereoscopic three-dimensional (3D) display device including a display panel including a plurality of pixels and a black matrix including a plurality of openings respectively exposing partial portions of the plurality of pixels, each of the plurality of pixels including a pixel electrode including a plurality of first fingers and a common electrode including a plurality of second fingers disposed between the plurality of first fingers, and a 3D optical plate disposed on a front surface or a rear surface of the display panel to perform control so that N (where N is a natural number equal to or more than two) number of view images displayed by the plurality of pixels are displayed as N number of views on a viewing zone which is spaced apart from the 3D optical plate by a certain distance. P (where P is an integer equal to or more than two) number of pixels adjacent to each other in a horizontal direction have different shapes exposed by the plurality of openings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Figure 1A:
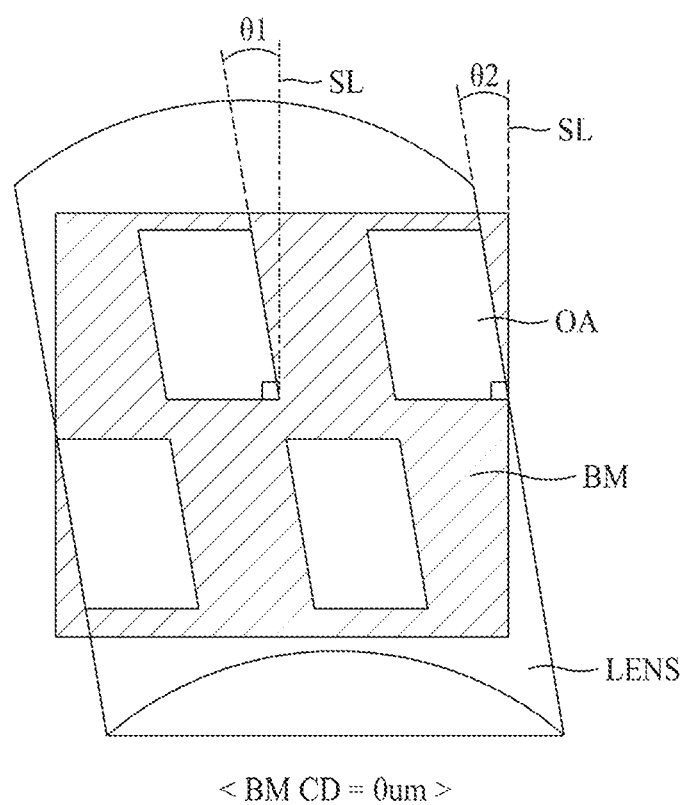
FIGS. 1A to 1C are diagrams for describing a luminance difference caused by a process error of a black matrix.

Reference will now be made in detail to the exemplary embodiments of the present invention, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present invention, their detailed descriptions will be omitted. The terms described in the specification should be understood as follows.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~' and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

An X axis direction, a Y axis direction, and a Z axis direction should not be construed as only a geometric relationship where a relationship there between is vertical, and may denote having a broader directionality within a scope where elements of the present invention operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Figure 1B:
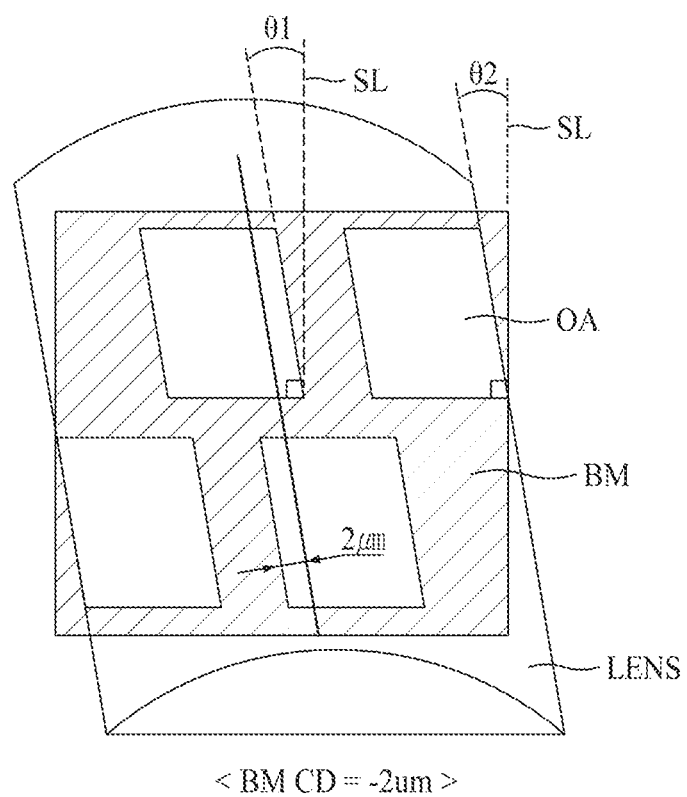
Figure 1C:
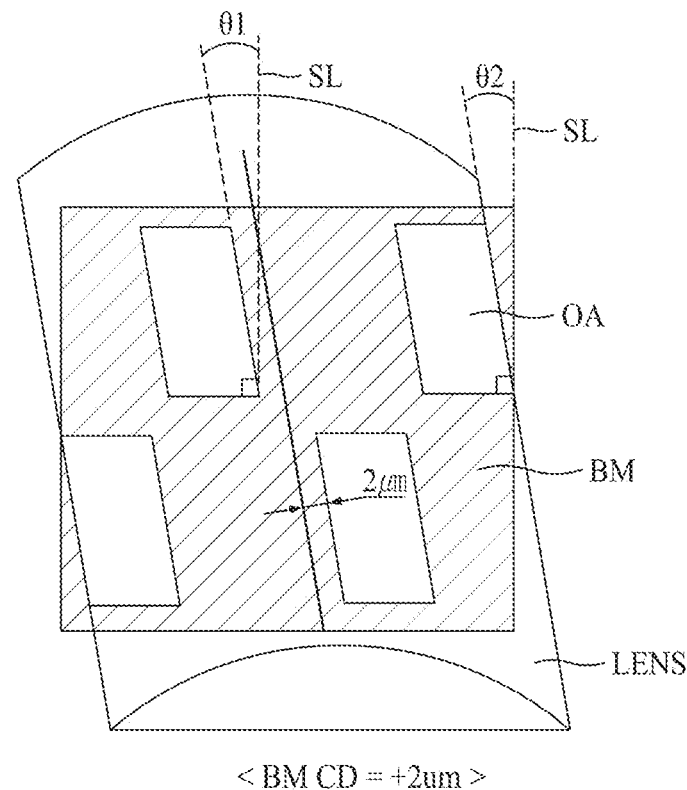
Figure 2A:
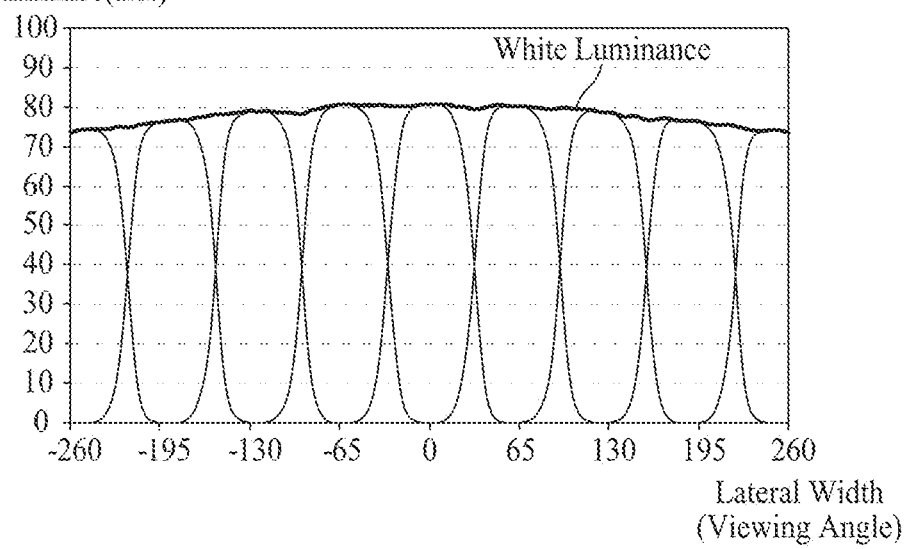
FIGS. 2A to 2C are diagrams showing white luminance according to FIGS. 1A to 1C.
Figure 2B:
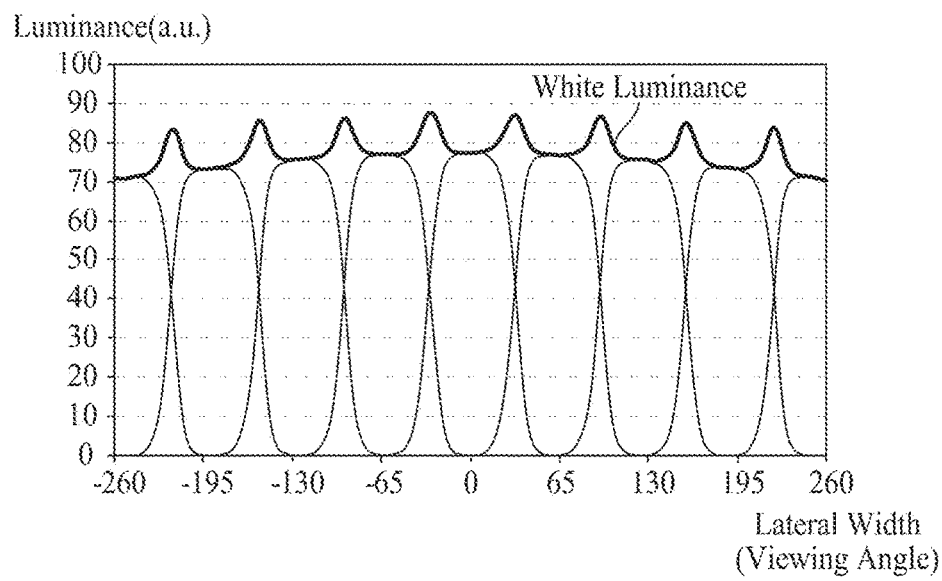
Figure 2C:
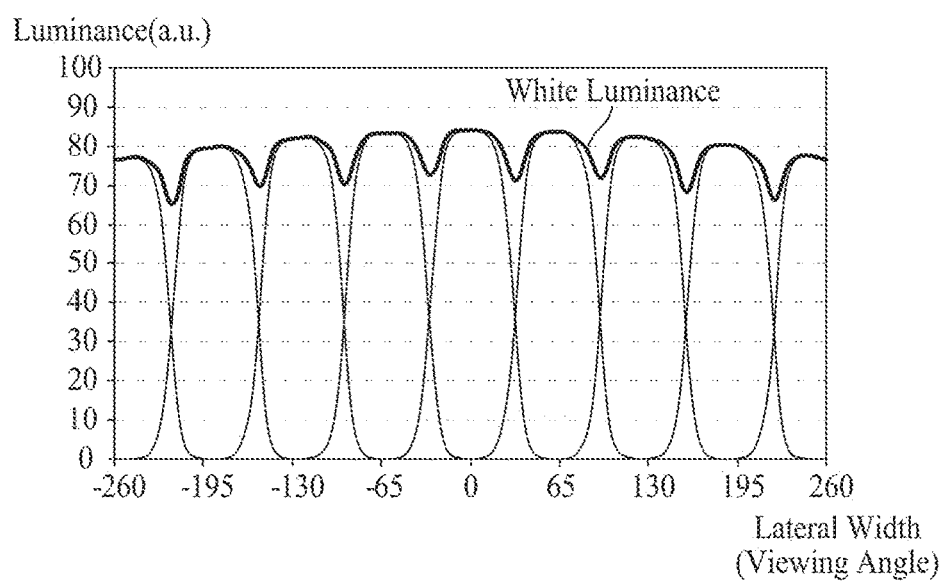

FIGS. 1A to 1C are diagrams for describing a luminance difference caused by a process error of a black matrix. FIGS. 2A to 2C are diagrams showing white luminance according to FIGS. 1A to 1C. A luminance difference (LD) caused by a process error of a black matrix will be described below in detail with reference to FIGS. 1A to 1C and 2A to 2C. In FIGS. 1A to 1C, for convenience of description, only a lens of a 3D optical plate and a black matrix BM including an opening OA are illustrated.

Referring to FIGS. 1A to 1C, the opening OA may have a parallelogram shape, and a first angle θ1 at which the opening OA is inclined may be the same as a second angle θ2 at which the lens of the 3D optical plate is inclined. The first angle θ1 at which the opening OA is inclined may denote an angle between a long side of the opening OA and a straight line SL which vertically extends from a short side of the opening OA. The second angle θ2 at which the lens of the 3D optical plate is inclined may denote an angle between the lens and the straight line SL which vertically extends from the short side of the opening OA.

FIG. 1A illustrates an example where a critical dimension CD of the black matrix BM is 0 μm, and a case where the black matrix BM is provided without a process error is illustrated. As illustrated in FIG. 1A, if the black matrix BM is provided without the process error, white luminance is almost uniformly maintained at a whole viewing angle of a display device as illustrated in FIG. 2A. Therefore, a luminance difference does not occur between views, or a viewer cannot recognize the luminance difference with eyes.

FIG. 1B illustrates an example where the critical dimension CD of the black matrix BM decreases by 2 μm, and a case where the opening OA is further widened than a case where the critical dimension CD is 0 μm is illustrated. If the critical dimension CD of the black matrix BM decreases by 2 μm as illustrated in FIG. 1B, a portion of the opening OA overlaps in a direction in which the lens is inclined. Therefore, luminance increases in the overlapped portion of the opening OA, and thus, as illustrated in FIG. 2B, luminance increases at certain viewing angles. That is, a luminance difference occurs between views.

FIG. 1C illustrates an example where the critical dimension CD of the black matrix BM increases by 2 μm, and a case where the opening OA is further narrowed than a case where the critical dimension CD is 0 μm is illustrated. If the critical dimension CD of the black matrix BM increases by 2 μm as illustrated in FIG. 1C, an area where the opening OA is not provided occurs in a direction in which the lens is inclined. Therefore, luminance decreases in the area where the opening OA is not provided, and thus, as illustrated in FIG. 2C, luminance decreases at certain viewing angles. That is, a luminance difference occurs between views.

Figure 3:
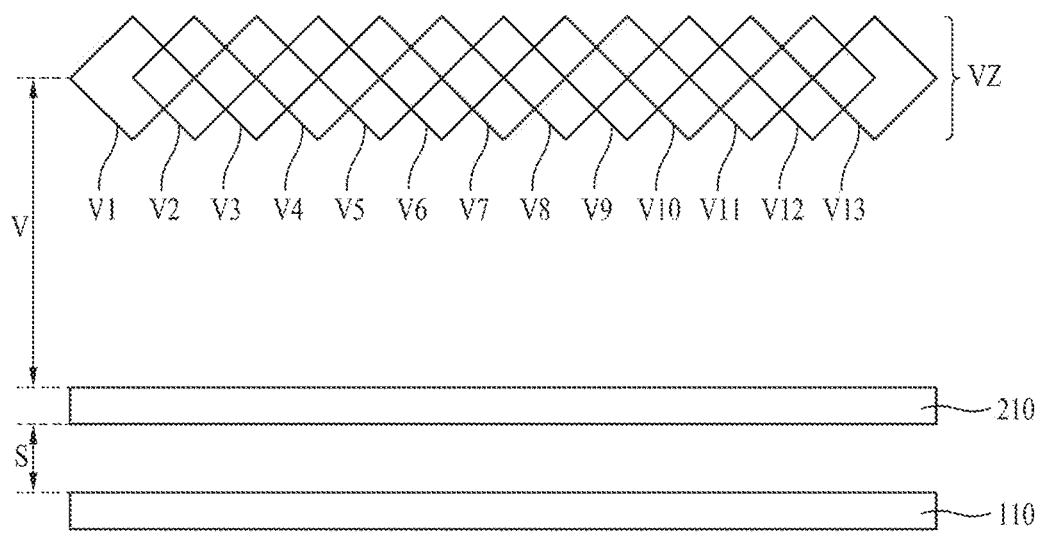
FIG. 3 is a diagram showing a view overlap in a viewing zone formed by a display panel and a 3D optical plate.

FIG. 3 is a diagram showing a view overlap in a viewing zone formed by a display panel and a 3D optical plate. In FIG. 3, for convenience of description, only a display panel 110 and a 3D optical plate 210 are illustrated.

Referring to FIG. 3, in a 3D mode, the display panel 110 may display a multi-view image including a plurality of view images, and a liquid crystal lens or a barrier may be provided in the 3D optical plate 210. Therefore, the plurality of view images displayed by the display panel 110 may be displayed as a plurality views V1 to V13 on a viewing zone VZ which is spaced apart from the 3D optical plate 210 by a 3D optimal viewing distance V. In FIG. 3, for convenience of description, thirteen views V1 to V13 are illustrated, but the number of views is not limited thereto. An nth (where n is a positive integer) view image may be displayed on an nth view.

In order to reduce a luminance difference which occurs between views due to a process error of a black matrix as illustrated in FIGS. 2B and 2C, the views may be generated to overlap each other. In FIG. 3, for convenience of description, an example where two views are generated to overlap each other is illustrated, but three or more views may be generated to overlap each other without being limited thereto. As the number of overlapping views increases, a luminance difference is reduced between views, but 3D crosstalk increases. The 3D crosstalk represents that a plurality of view images are seen to overlap each other by eyes of a viewer. As the 3D crosstalk increases, a viewer feels inconvenience in viewing a 3D image.

It is difficult to simultaneously solve 3D crosstalk and a luminance difference between views. Therefore, it is desirable to reduce a luminance difference between views without using a view overlap method. Also, it is desirable to minimize a luminance difference in a view as well as a luminance difference between views.

Hereinafter, an embodiment of the present disclosure will be described in detail with reference to FIGS. 4 to 9.

Figure 4:
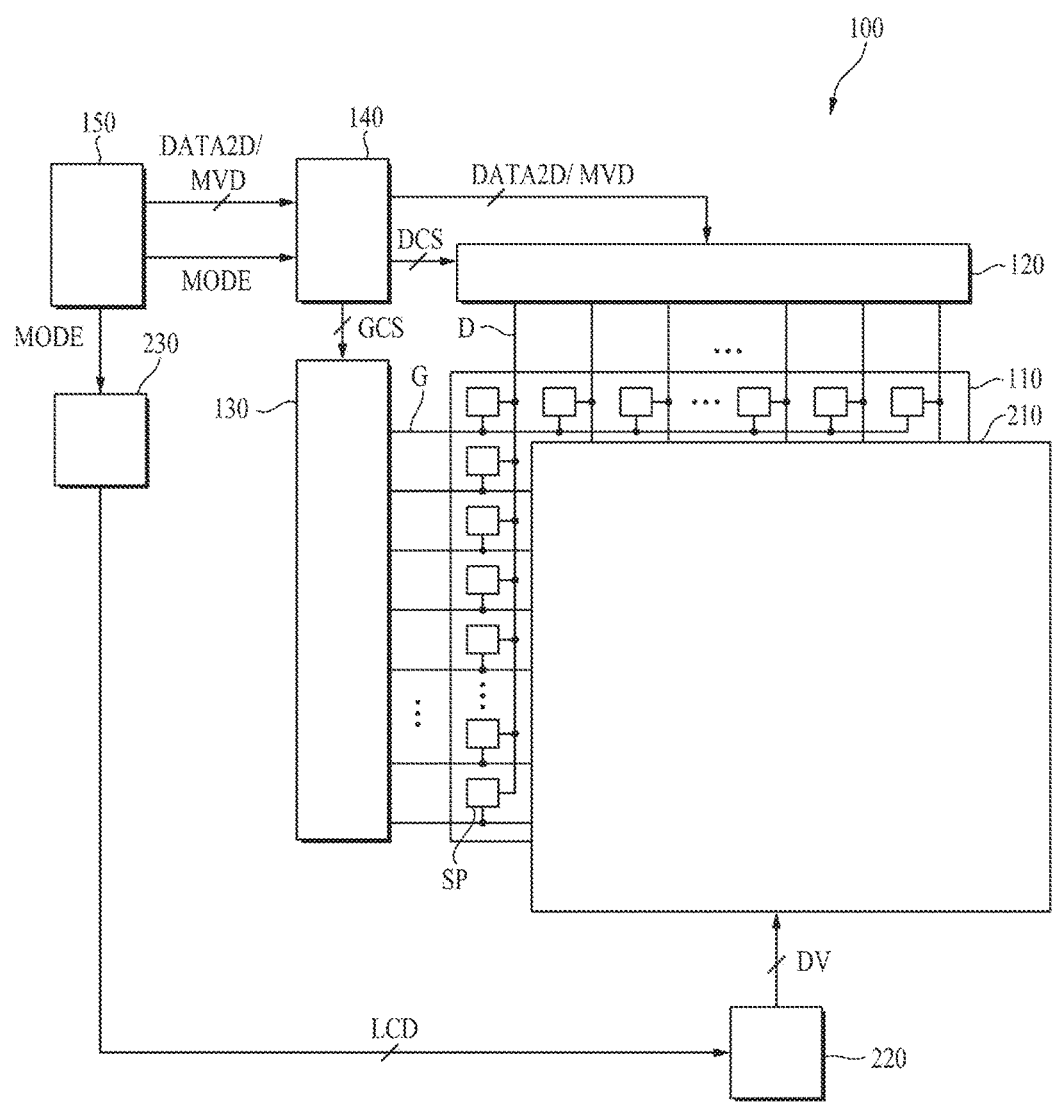
FIG. 4 is a block diagram illustrating an autostereoscopic 3D display device according to an embodiment of the present disclosure.

FIG. 4 is a block diagram illustrating an autostereoscopic 3D display device 100 according to an embodiment of the present disclosure. Referring to FIG. 4, the autostereoscopic 3D display device 100 according to an embodiment of the present disclosure may include a display panel 110, a display panel driver, a display panel controller 140, a host system 150, a 3D optical plate 210, a 3D optical plate driver 220, and a 3D optical plate controller 230.

The autostereoscopic 3D display device 100 according to an embodiment of the present disclosure may be implemented as a flat panel display device such as a liquid crystal display (LCD) device, a field emission display (FED) device, a plasma display panel (PDP), an organic light emitting display (OLED), or the like. In this disclosure below, an example where the autostereoscopic 3D display device 100 is implemented as an LCD device is exemplified, but the present embodiment is not limited thereto.

The display panel 110 may display an image by using a plurality of pixels SP. The display panel 110 may include a lower substrate, an upper substrate, and a liquid crystal layer disposed between the lower substrate and the upper substrate. A plurality of data lines D and a plurality of gate lines G may be arranged on the lower substrate of the display panel 110. The data lines D may intersect the gate lines G.

Figure 6:
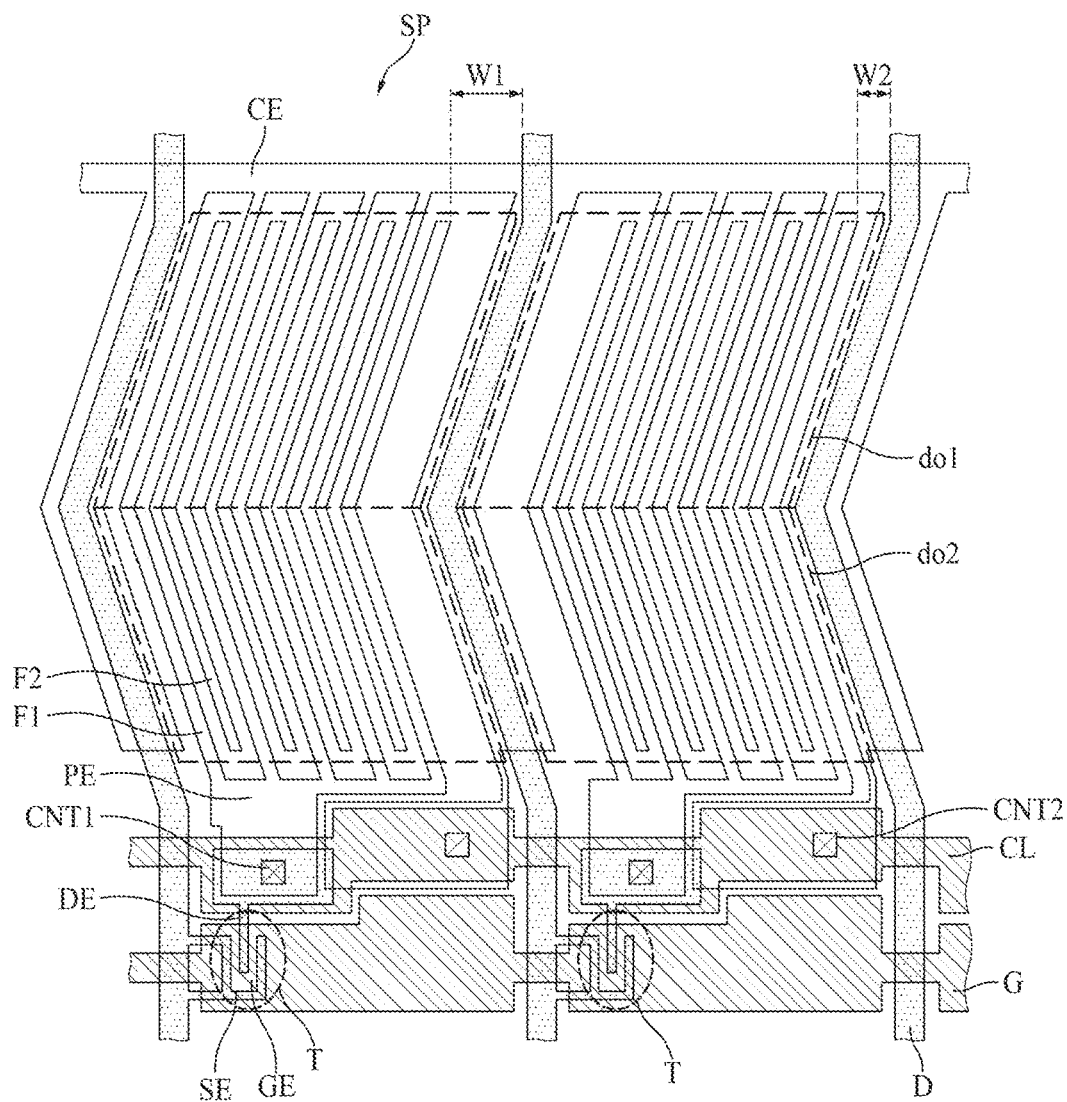
FIG. 6 is a plan view illustrating pixels adjacent to each other in a horizontal direction according to an embodiment of the present disclosure.

The pixels SP, as illustrated in FIG. 4, may be respectively provided in a plurality of areas defined by intersections of the data lines D and the gate line G. Each of the pixels SP may be connected to a data line D and a gate line G which correspond thereto. Each of the pixels SP, as illustrated in FIG. 6, may include a transistor, a pixel electrode, a common electrode, and a storage capacitor. The transistor may be turned on by a gate signal supplied through the gate line G and may supply a data voltage, supplied through the data line D, to the pixel electrode. The common electrode may be connected to a common line and may be supplied with a common voltage through the common line. Therefore, each of the pixels SP may drive liquid crystal of the liquid crystal layer with an electric field generated by a voltage difference between the data voltage supplied to the pixel electrode and the common voltage supplied to the common electrode, thereby controlling a transmittance of light incident from a backlight unit. Also, the storage capacitor may be disposed between the pixel electrode and the common electrode, for holding a constant potential difference between the pixel electrode and the common electrode. The transistor, the pixel electrode, the common electrode, and the storage capacitor will be described below in detail with reference to FIG. 6.

The common electrode may be provided on the upper substrate in a vertical alignment (VA) driving mode such as a twisted nematic (TN) mode or a vertical alignment (VA) mode, and may be provided on the lower substrate along with the pixel electrode in an in-plane switching (IPS) driving mode such as a fringe field switching (FFS). A liquid crystal mode of the display panel 110 may be implemented as an arbitrary liquid crystal mode in addition to the TN mode, the VA mode, the IPS mode, and the FFS mode.

A black matrix and color filers may be provided on the upper substrate of the display panel 110. The black matrix may include an opening, and the color filters may be provided in an opening which is not covered by the black matrix. If the display panel 110 is provided in a color filter on TFT (COT) structure, the color filters may be provided on the lower substrate of the display panel 110. The black matrix including the opening will be described below in detail with reference to FIGS. 7 to 9.

A polarizer may be attached on each of the lower substrate and the upper substrate of the display panel 110, and an alignment layer for adjusting a pre-tilt angle of the liquid crystal may be formed. A column spacer for maintaining a cell gap of the liquid crystal layer may be provided between the lower substrate and the upper substrate of the display panel 110.

The display panel 110 may use a transmissive liquid crystal display panel that modulates light from a backlight unit. The backlight unit may include light sources that emits light with a driving current supplied from a backlight driver, a light guide plate (or a diffusive plate), and a plurality of optical sheets. The backlight unit may be implemented as a direct type or edge type backlight unit. The light sources of the backlight unit may include one or two or more of a hot cathode fluorescent lamp (HCFL), a cold cathode fluorescent lamp (CCFL), an external electrode fluorescent lamp (EEFL), a light emitting diode (LED), and an organic light emitting diode (OLED).

The backlight driver may generate a driving current for turning on the light sources of the backlight unit. The backlight driver may generate the driving current supplied to the light sources according to control by the backlight controller. The backlight controller may transfer backlight control data, including a duty ratio control value of a pulse width modulation (PWM) signal, to the backlight driver in a serial peripheral interface (SPI) data format according to a global/local diming signal (DIM) input from the host system 150.

The display panel driver may include a data driver 120 and a gate driver 130.

The data driver 120 may receive a data control signal DCS and two-dimensional (2D) data DATA2D or multi-view data MVD from the display panel controller 140. The data driver 120 may receive the 2D data DATA2D in a 2D mode and may receive the multi-view data MVD in the 3D mode. The data driver 120 may convert the 2D data DATA2D or the multi-view data MVD into a positive/negative gamma compensation voltage to generate analog data voltages according to the data control signal DCS. The analog data voltages output from a plurality of source drive integrated chips (ICs) may be supplied to the data lines D of the display panel 110.

The gate driver 130 may receive a gate control signal GCS from the display panel controller 140. The gate driver 130 may generate gate signals according to the gate control signal GCS and may sequentially supply the gate signals to the gate lines G of the display panel 110. Therefore, the data voltage supplied through the data line D may be supplied to a pixel SP which is supplied with the gate signals.

The display panel controller 140 may receive the 2D data DATA2D from the host system 150 in the 2D mode and may receive the multi-view data MVD in the 3D mode. Also, the display panel controller 140 may receive timing signals and a mode signal MODE from the host system 150. The timing signals may include a horizontal synchronization signal, a vertical synchronization signal, a data enable signal, a dot clock, etc. The display panel controller 140 may generate the gate control signal GCS and the data control signal DCS, based on the timing signals.

The display panel controller 140 may supply the gate control signal GCS to the gate driver 130 and may supply the data control signal DCS and the 2D data DATA2D or the multi-view data MVD to the data driver 120. The display panel controller 140 may supply the 2D data DATA2D to the data driver 120 in the 2D mode and may supply the multi-view data MVD to the data driver 120 in the 3D mode.

The host system 150 may supply the 2D data DATA2D or the multi-view data MVD to the display panel controller 140 through an interface such as a low voltage differential signaling (LVDS) interface, a transition minimized differential signaling (TMDS) interface, or the like. Also, the host system 150 may supply the mode signal MODE and the timing signals to the display panel controller 140 and may supply the mode signal MODE to the 3D optical plate controller 230. The mode signal MODE may be a signal indicating a current mode which corresponds to one of the 2D mode and the 3D mode. For example, it may be set such that when the mode signal MODE has a first logic level voltage, the mode signal MODE indicates the 2D mode, and when the mode signal MODE has a second logic level voltage, the mode signal MODE indicates the 3D mode.

According to an embodiment of the present disclosure, the 3D optical plate 210 for allowing an image displayed by the display panel 110 to be displayed as-is in the 2D mode and allowing a multi-view image displayed by the display panel 110 to be displayed as a plurality of views on a viewing zone in the 3D mode is needed. In an embodiment of the present disclosure, an example where the 3D optical plate 210 is the liquid crystal lens has been described above, but the present embodiment is not limited thereto. In other embodiments, the 3D optical plate 210 may be a switchable barrier, a parallax barrier), or a lenticular lens sheet.

The 3D optical plate 210 may be disposed on a front surface or a rear surface of the display panel 110. If the 3D optical plate 210 is disposed on the front surface of the display panel 110 as illustrated in FIG. 3, the 3D optical plate 210 may be spaced apart from the 3D optical plate 210 by a rear distance S. The 3D optical viewing distance V may be adjusted by adjusting the rear distance S.

In the 2D mode, the display panel 110 may display a 2D image, and the liquid lens or the barrier may not be provided in the 3D optical plate 210. Therefore, the 2D image displayed by the display panel 110 may pass through the 3D optical plate 210 as-is and may be seen to a viewer.

In the 3D mode, the display panel 110 may display a multi-view image including a plurality of view images, and the liquid crystal lens or the barrier may be provided in the 3D optical plate 210. That is, the 3D optical plate 210 may perform control in order for N (where N is a natural number equal to or more than two) number of view images displayed by the display panel 110 to be displayed as N number of views on the viewing zone VZ which is spaced apart from the 3D optical plate 210 by the 3D optimal viewing distance S. For example, as illustrated in FIG. 3, the plurality of view images displayed by the display panel 110 may be displayed as the plurality of views V1 to V13 on the viewing zone VZ, which is spaced apart from the 3D optical plate 210 by the 3D optimal viewing distance V, by the 3D optical plate 210. Therefore, the viewer can see a 3D image.

Figure 5:
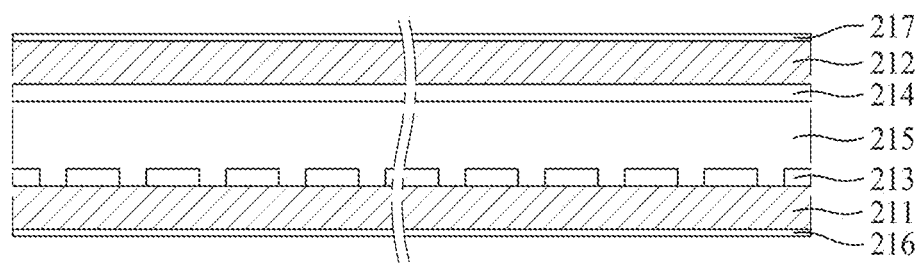
FIG. 5 is a cross-sectional view of a 3D optical plate of FIG. 4 according to an embodiment of the present disclosure.

If the 3D optical plate 210 is implemented with the liquid crystal lens or the switchable barrier, as illustrated in FIG. 5, the 3D optical plate 210 may include a first substrate 211, a second substrate 212, first electrodes 213, a second electrode 214, a liquid crystal layer 215, a first polarizer 216, and a second polarizer 217.

The first and second substrates 211 and 213 may each be implemented with glass or a plastic film. The first polarizer 216 may be attached on a first surface of the first substrate 211 facing the display panel 110, and the first electrodes 213 may be provided on a second surface of the first substrate 211 that is opposite the first surface of the first substrate 211. The first electrodes 213 may be division electrodes, and thus, each of the first electrodes 213 may be spaced apart from a first electrode adjacent thereto by a certain interval. First driving voltages DV1 may be respectively supplied to the first electrodes 213 by the 3D optical plate driver 220.

The second electrode 214 may be provided on a first surface of the second substrate 212 facing the first substrate 211, and the second polarizer 217 may be attached on a second surface of the second substrate 212 that is opposite the first surface of the second substrate 212. A light transmission axis of the first polarizer 216 may be perpendicular to a light transmission axis of the second polarizer 217. The second electrode 214 may be provided as one layer on the entire first surface of the second substrate 212. A second driving voltage DV2 may be supplied to the second electrode 214 by the 3D optical plate driver 220.

The liquid crystal layer 215 of the 3D optical plate 210 may be provided between the first substrate 211 and the second substrate 212. Liquid crystal molecules of the liquid crystal layer 215 may be driven by an electrical field generated by a potential difference between the second electrode 214 and each of the first electrodes 213. Therefore, in the 2D mode, the liquid crystal molecules of the liquid crystal layer 215 may not form the lens or the barrier, and in the 3D mode, the liquid crystal molecules of the liquid crystal layer 215 may form the lens or the barrier.

The 3D optical plate driver 220 may respectively supply the first driving voltages DV1 to the first electrodes 213 of the 3D optical plate 210 and may supply the second driving voltage DV2 to the second electrode 214, based on optical plate control data LCD from the 3D optical plate controller 230. For example, in the 2D mode, the 3D optical plate driver 220 may respectively supply the first driving voltages DV1 to the first electrodes 213 and may supply the second driving voltage DV2 to the second electrode 214, so that the liquid crystal molecules of the liquid crystal layer 215 driven by the electric field generated between the second electrode 214 and each of the first electrodes 213 allows light passing through the first polarizer 216 to pass through the second polarizer 217. As a result, in the 2D mode, the lens or the barrier may not be provided in the 3D optical plate 210. In the 3D mode, the 3D optical plate driver 220 may respectively supply the first driving voltages DV1 to the first electrodes 213 and may supply the second driving voltage DV2 to the second electrode 214, so that the liquid crystal molecules of the liquid crystal layer 215 driven by the electric field generated between the second electrode 214 and each of the first electrodes 213 have a lens-shaped refractive index or form the barrier. As a result, in the 3D mode, the lens or the barrier may be provided in the 3D optical plate 210.

The 3D optical plate driver 220 may periodically invert polarities of the first and second driving voltages DV1 and DV2 respectively supplied to the first electrodes 213 and the second electrode 214, for preventing a direct-current afterimage of the liquid crystal. The direct-current afterimage of the liquid crystal denotes that electrified particles of liquid crystal molecules are piled on an alignment layer in direct current (DC) driving, and thus, pre-tilt angles of the liquid crystal molecules change. The 3D optical plate driver 220 may perform alternating current (AC) driving for periodically inverting the polarities of the first and second driving voltages DV1 and DV2 respectively supplied to the first electrodes 213 and the second electrode 214, thereby preventing the direct-current afterimage of the liquid crystal.

The 3D optical plate controller 230 may receive the mode signal MODE from the host system 150. In the 2D mode, the 3D optical plate controller 230 may supply the optical plate control data LCD to the 3D optical plate driver 220 in order for the 3D optical plate 210 not to form the lens or the barrier. In the 3D mode, the 3D optical plate controller 230 may supply barrier control data BCD to the 3D optical plate driver 220 in order for the 3D optical plate 210 to form the lens or the barrier.

FIG. 6 is a plan view illustrating pixels adjacent to each other in a horizontal direction. In FIG. 6, a plan view of two pixels SP adjacent to each other in the horizontal direction is illustrated. In the following description, the horizontal direction denotes a lengthwise direction of the gate line G of FIG. 4, and a vertical direction denotes a lengthwise direction of the data line D of FIG. 4.

Referring to FIG. 6, the pixels SP may each include a transistor T, a pixel electrode PE, a common electrode CE, and a storage capacitor Cst.

The transistor T may include a gate electrode GE extending from the gate line G, a source electrode SE extending from the data line D, and a drain electrode connected to the pixel electrode PE. When a gate signal corresponding to a gate high voltage is applied to the gate line G, the transistor T may supply a data voltage, supplied through the data line D, to the pixel electrode PE.

The pixel electrode PE may be connected to the drain electrode of the transistor T through a first contact hole CNT1 in a lower area of the pixel SP. The pixel electrode PE may include a plurality of first fingers F1. The plurality of first fingers F1 may protrude from the pixel electrode PE and may extend adjacent to the common electrode CE disposed in an upper area of the pixel SP. That is, the plurality of first fingers F1 may protrude from the pixel electrode PE and may extend to the upper area of the pixel SP.

The common electrode CE may be connected to a common line CL parallel to the gate line G through a second contact hole CNT2 in the lower area of the pixel SP. The common electrode CE may include a plurality of second fingers F2. The plurality of second fingers F2 may protrude from the common electrode CE disposed in an upper portion of the pixel SP and may extend adjacent to the pixel electrode PE. That is, the plurality of second fingers F2 may protrude from the common electrode CE and may extend to the lower area of the pixel SP.

Each of the plurality of second fingers F2 may be disposed between adjacent first fingers F1. Therefore, a lateral electric field may be generated between the pixel electrode PE and the common electrode CE.

The pixel SP may have a multi-domain structure which includes a first domain do1 and a second domain do2. The multi-domain structure may differently control an alignment direction of the liquid crystal in the first domain do1 and the second domain do2, and thus, color shift and a viewing angle are improved. In the multi-domain structure, the plurality of first fingers F1 and the plurality of second fingers F2 may have a structure which is bent in a boundary between the first domain do1 and the second domain do2. Therefore, the first fingers F1 and the second fingers F2 may be arranged in parallel in a first direction in the first domain do1 and may be arranged in parallel in a second direction in the second domain do2.

First fingers F1 and second fingers F2 of one pixel SP may be shifted and arranged in the horizontal direction with respect to first fingers F1 and second fingers F2 of another pixel SP adjacent to the one pixel SP in the horizontal direction. This will be described below with reference to FIG. 7.

Figure 7:
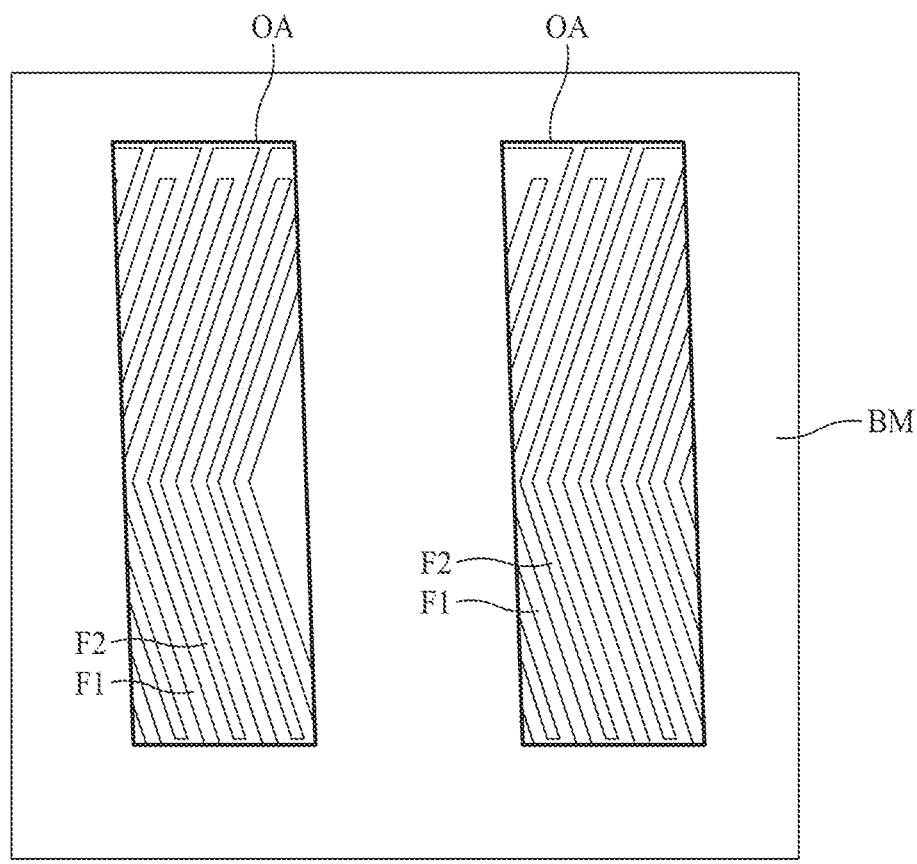
FIG. 7 is a plan view illustrating an opening of each of pixels adjacent to each other in a horizontal direction according to an embodiment of the present disclosure.

FIG. 7 is a plan view illustrating an opening of each of pixels adjacent to each other in a horizontal direction.

Referring to FIG. 7, a black matrix BM may include a plurality of openings OA, and a portion of each of pixels SP may be exposed in the opening OA.

The openings OA may each have a parallelogram shape. Shapes of the openings OA may be the same. Long sides of the openings OA may be parallel and may have the same length, and short sides of the openings OA may be parallel and may have the same length. Therefore, areas of the openings OA may be the same. Also, the openings OA may be arranged at first intervals in the horizontal direction and may be arranged at second intervals in the vertical direction.

That is, since the openings OA have the same shape and size and are arranged at equal intervals, areas of pixels SP respectively exposed by the openings OA may be the same. In an embodiment of the present disclosure, first fingers F1 and second fingers F2 of one pixel SP may be shifted and arranged in the horizontal direction with respect to first fingers F1 and second fingers F2 of another pixel SP adjacent to the one pixel SP in the horizontal direction. Therefore, a distance W1 between a first finger F1 disposed on most one side of one pixel SP and a data line D adjacent thereto may differ from a distance W2 between a first finger F1 disposed on most one side of a pixel adjacent to the one pixel SP in the horizontal direction and a data line D adjacent thereto. Therefore, as illustrated in FIG. 7, shapes of first fingers F1 and second fingers F2 exposed by an opening OA of one pixel SP may differ from shapes of first fingers F1 and second fingers F2 exposed by an opening OA of a pixel SP adjacent to the one pixel SP in the horizontal direction.

In FIG. 6, for convenience of description, it has been described above that first fingers F1 and second fingers F2 of one pixel SP are shifted and arranged in the horizontal direction with respect to first fingers F1 and second fingers F2 of another pixel SP adjacent to the one pixel SP in the horizontal direction. However, the present embodiment is not limited thereto, and first fingers F1 and second fingers F2 of P (where P is an integer equal to or more than two) number of pixels SP adjacent to each other in the horizontal direction may be sequentially shifted in the horizontal direction and arranged. Therefore, a distance W1 between a first finger F1, disposed on most one side of one pixel SP of the P number of pixels SP adjacent to each other in the horizontal direction, and a data line D adjacent thereto may differ from a distance W2 between a first finger F1 disposed on most one side of a pixel adjacent to the one pixel SP in the horizontal direction and a data line D adjacent thereto. Accordingly, shapes of first fingers F1 and second fingers F2 exposed by openings OA in the P number of pixels SP adjacent to each other in the horizontal direction may differ.

Figure 8:
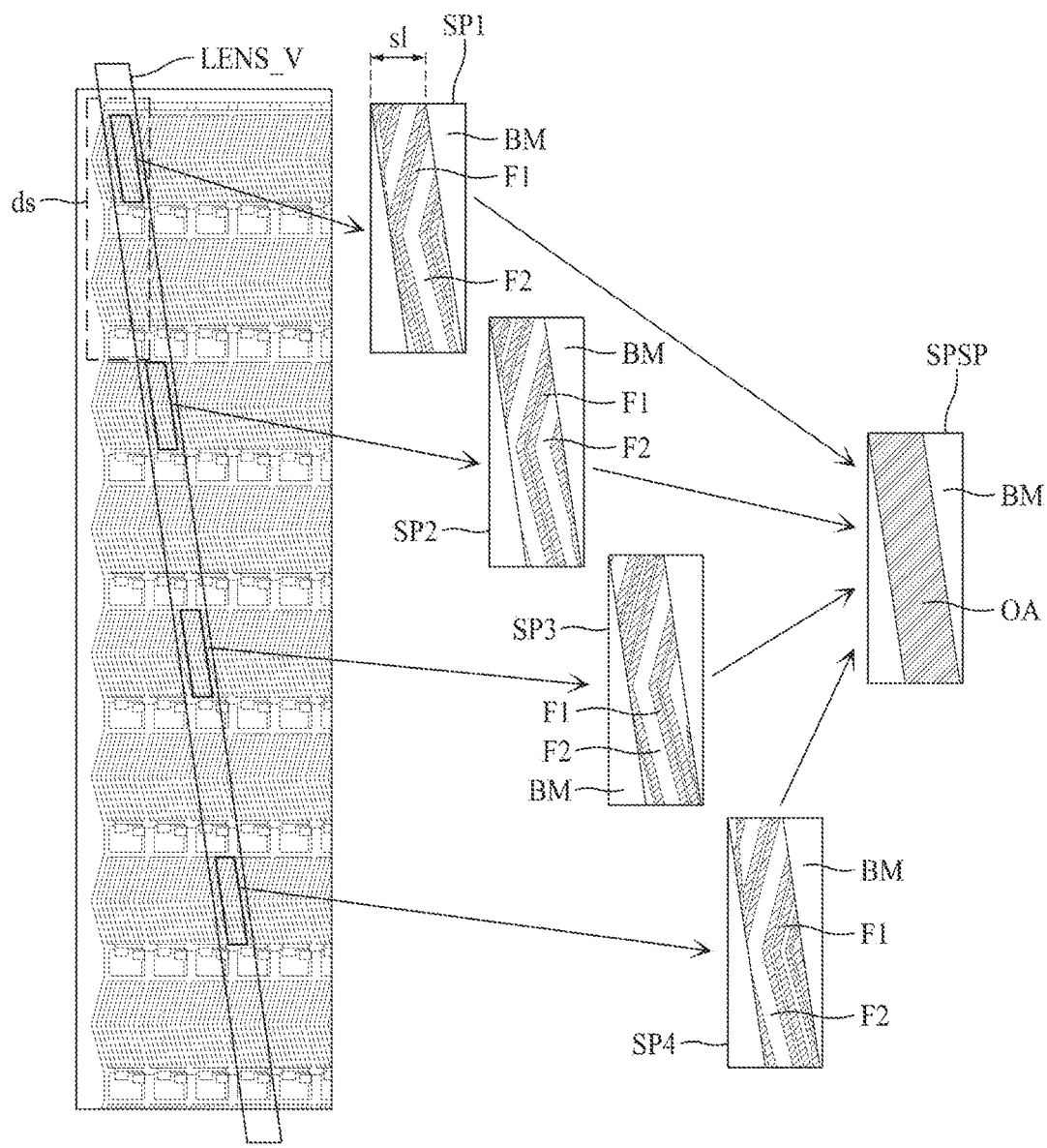
FIG. 8 is a diagram illustrating pixels and a lens of a 3D optical plate in a ½ delta structure according to an embodiment of the present disclosure.

FIG. 8 is a diagram illustrating pixels and a lens of a 3D optical plate in a ½ delta structure. Hereinafter, an embodiment of the present disclosure for minimizing a luminance difference occurring in one view will be described in detail with reference to FIG. 8.

Referring to FIG. 8, a ½ delta structure ds may be a matrix structure which includes two pixels in a vertical direction (a Y-axis direction) and one pixel in a horizontal direction (an X-axis direction). In an embodiment of the present disclosure, for convenience of description, the ½ delta structure ds is exemplified, but the present embodiment is not limited thereto. That is, in an embodiment of the present disclosure, a 1/M (where M is an integer equal to or more than two) delta structure may be used. The 1/M delta structure may be a matrix structure where M number of pixels are disposed in the vertical direction (the Y-axis direction), and one pixel is disposed in the horizontal direction (the X-axis direction). Only one of the pixels included in the 1/M delta structure may be shown in one of N number of views. For example, only one of two pixels included in the ½ delta structure ds may be shown in one of the N number of views.

In the 1/M delta structure, a short side length sl of an opening OA may be calculated as expressed in the following Equation (1):

$$sl = \frac{a}{M} \quad (1)$$

where M denotes M of the 1/M delta structure, and a denotes a short-direction length of a pixel SP. For example, in the ½ delta structure, the short side length sl of the opening OA may be half of the short-direction length of the pixel SP.

In the 1/M delta structure, a second angle θ2 at which a lens of a 3D optical plate is inclined may be calculated as expressed in the following Equation (2):

$$\theta 2 = \arctan\left(\frac{a}{b \times M}\right) \quad (2)$$

where M denotes M of the 1/M delta structure, a denotes a short-direction length of a pixel SP, and b denotes a long-direction length of the pixel SP.

For example, in the ½ delta structure, if a ratio of the short-direction length to the long-direction length of the pixel SP is 1:3, a second angle θ2 at which a lens of a 3D optical plate is inclined may be calculated as expressed in the following Equation (3):

$$\theta 2 = \arctan(\tfrac{1}{6}) \quad (3)$$

As described above, when pixels SP display view images in the ½ delta structure, the opening OA is provided based on the short side length sl of the opening OA calculated as expressed in Equation (1), and a lens of the 3D optical plate is provided based on the angle calculated as expressed in Equation (3), shapes of openings OA of first to fourth pixels SP1 to SP4 that display one view image on one view may be as illustrated in FIG. 8.

That is, in an embodiment of the present disclosure, shapes of first fingers F1 and second fingers F2 exposed by openings OA in P number of pixels SP adjacent to each other in the horizontal direction may differ. Therefore, shapes of first fingers F1 and second fingers F2 exposed by the openings OA in the first to fourth pixels SP1 to SP4 may differ.

Luminance in an area where the first fingers F1 of the pixel electrode PE are disposed may be higher than luminance in an area where the second fingers F2 of the common electrode CE are disposed. If shapes of first fingers F1 and second fingers F2 exposed by the openings OA in the first to fourth pixels SP1 to SP4 are the same, luminance in an area where the first fingers F1 are disposed is relatively high shown in a view, and luminance in an area where the second fingers F2 are disposed is relatively low shown in the view.

However, in an embodiment of the present disclosure, P (where P is an integer equal to or more than two) number of pixels adjacent to each other in the horizontal direction may have different shapes exposed by openings OA. As a result, in an embodiment of the present disclosure, as illustrated in FIG. 8, shapes of the first fingers F1 and the second fingers F2 exposed by the openings OA in the first to fourth pixels SP1 to SP4 may differ, and thus, an area which is high in luminance and an area which is low in luminance may be offset in the first to fourth pixels SP1 to SP4, whereby luminance of a pixel SPSP displayed by an overlap of the first to fourth pixels SP1 to SP4 is uniform in a whole opening OA as illustrated in FIG. 8. Accordingly, a luminance difference in a view is minimized.

Figure 9:
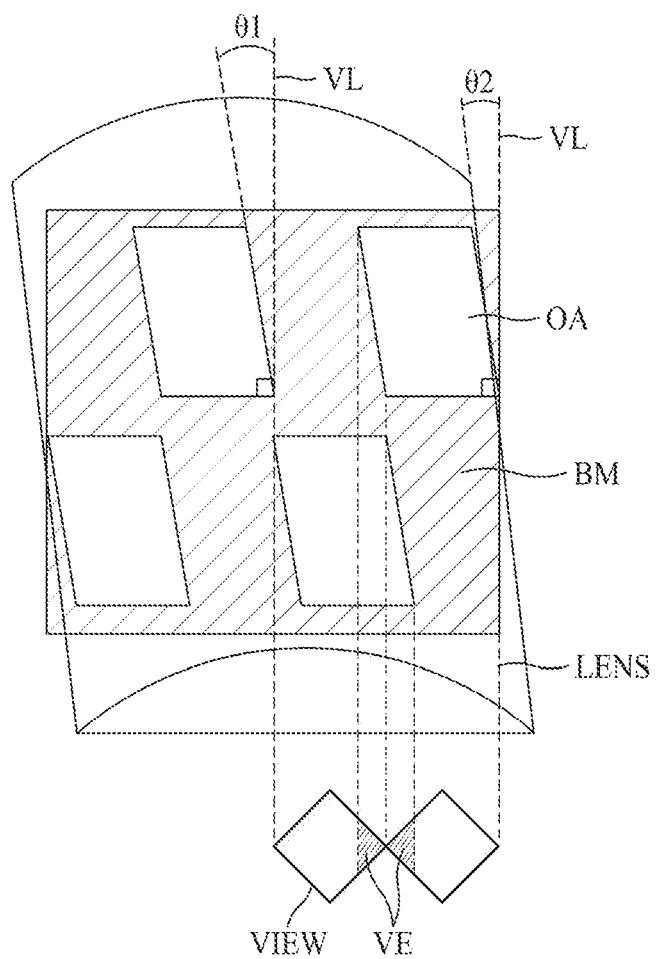
FIG. 9 is a diagram illustrating a lens of a 3D optical plate and a black matrix including an opening according to an embodiment of the present disclosure.

FIG. 9 is a diagram illustrating a lens of a 3D optical plate and a black matrix including an opening according to an embodiment of the present disclosure. In FIG. 9, for convenience of description, only a lens of a 3D optical plate and a black matrix BM including an opening OA are illustrated. For convenience of description, FIG. 9 illustrates an example where a critical dimension CD of the black matrix BM is 0 µm, and a case where the black matrix BM is provided without a process error is illustrated.

Referring to FIG. 9, the opening OA may have a parallelogram shape, and a first angle θ1 at which the opening OA is inclined may differ from a second angle θ2 at which the lens of the 3D optical plate is inclined. The first angle θ1 at which the opening OA is inclined may denote an angle between a long side of the opening OA and a straight line SL which vertically extends from a short side of the opening OA. The second angle θ2 at which the lens of the 3D optical plate is inclined may denote an angle between the lens and the straight line SL which vertically extends from the short side of the opening OA.

In a case where the first angle θ1 at which the opening OA is inclined differs from the second angle θ2 at which the lens of the 3D optical plate is inclined, even when a critical dimension deviation of the black matrix 124 occurs, an area where openings OA overlap each other as illustrated in FIG. 2B or an area where an opening OA is not provided as illustrated in FIG. 2C is reduced, and thus, a luminance difference between views is minimized. However, in a case where the first angle θ1 at which the opening OA is inclined differs from the second angle θ2 at which the lens of the 3D optical plate is inclined, edge areas of openings OA overlap each other by a certain interval as illustrated in FIG. 9. The edge areas of the openings OA are seen as edge areas in one view, and for this reason, as illustrated in FIG. 9, 3D crosstalk occurs in an edge area VE of a view VIEW. However, since center areas of the openings OA do not overlap each other, 3D crosstalk does not occur in a center area of a view. Therefore, in a case where the first angle θ1 at which the opening OA is inclined differs from the second angle θ2 at which the lens of the 3D optical plate is inclined, 3D crosstalk which a viewer feels is very small. Accordingly, in an embodiment of the present disclosure, since the first angle θ1 at which the opening OA is inclined differs from the second angle θ2 at which the lens of the 3D optical plate is inclined, 3D crosstalk is minimized, and a luminance difference between views is reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An autostereoscopic three-dimensional (3D) display device comprising:
   a display panel including a plurality of pixels and a black matrix including a plurality of openings respectively exposing partial portions of the plurality of pixels, each of the plurality of pixels including a pixel electrode including a plurality of first fingers and a common electrode including a plurality of second fingers disposed between the plurality of first fingers, wherein the pixel electrode and the common electrode included in each of the plurality of pixels are physically separated from each other, wherein the plurality of first fingers protrude from the pixel electrode in a first direction and the plurality of second fingers protrude from the common electrode in a second direction that is towards the plurality of first fingers such that at least one of the plurality of second fingers is interleaved between two of the plurality of first fingers in a plan view of the autostereoscopic 3D display device; and
   a 3D optical plate disposed on a surface of the display panel to perform control so that a plurality of view images displayed by the plurality of pixels are displayed as N number of views on a viewing zone which is spaced apart from the 3D optical plate by a certain distance, the 3D optical plate including a lens,
   wherein each of the plurality of openings are inclined at first angle, and the first angle is an angle between a long side of each of the plurality of openings and a straight line which vertically extends from a short side of a corresponding opening, wherein the lens is inclined at a second angle that is an angle between the lens and the straight line which vertically extends from the short side of each of the plurality of openings,
   wherein the first angle is greater than zero and differs from the second angle,
   wherein a first pixel has a first pattern of first fingers and second fingers exposed by a first opening of the plurality of openings, and a second pixel adjacent to the first pixel in a horizontal direction has a second pattern of first fingers and second fingers exposed by a second opening of the plurality of openings, the first pattern of first fingers and second fingers distinct from the second pattern of first fingers and second fingers;
   wherein the first fingers of the plurality of pixels are parallel with each other, and a distance between a first finger disposed on one side of the first pixel and a first edge of a first data line adjacent to the first finger differs from a distance between a first finger disposed on one side of the second pixel and a first edge of a second data line adjacent to the first finger disposed on the one side of the second pixel, the first edge of the first data line corresponding to the first edge of the second data line,
   wherein openings of two pixels that are arranged adjacent to each other in a vertical direction do not overlap each other in a long side direction of the openings.

2. The autostereoscopic 3D display device of claim 1, wherein a position of the first fingers and the second fingers of the first pixel are shifted in the horizontal direction with respect to a position of the first fingers and the second fingers of the second pixel.

3. The autostereoscopic 3D display device of claim 2, wherein the plurality of openings each have a parallelogram shape and are arranged at equal intervals in the horizontal direction.

4. The autostereoscopic 3D display device of claim 1, wherein either the first pixel or the second pixel is arranged in a vertical direction and is seen in one of the plurality of views.

5. The autostereoscopic 3D display device of claim 4, wherein if a short side length of each of the plurality of openings is "sl", the short side length of each of the plurality of openings is expressed as Equation below:

$$sl = \frac{a}{M}$$

where "a" denotes a short-direction length of each of the plurality of pixels, "M" denotes the number of pixels in the vertical direction.

6. The autostereoscopic 3D display device of claim 4, wherein if the second angle is θ2, the second angle is expressed as Equation below:

$$\theta2 = \arctan\left(\frac{a}{b \times M}\right)$$

where "a" denotes a short-direction length of each of the plurality of pixels, "M" denotes the number of pixels in the vertical direction, and "b" denotes a long-direction length of each of the plurality of pixels.

7. The autostereoscopic 3D display device of claim 1, wherein the plurality of openings are inclined in a same direction as the lens.

8. The autostereoscopic 3D display device of claim 1, wherein each of the N number of views is non-overlapping with another one of the N number of views.

9. The autostereoscopic 3D display device of claim 1, wherein the plurality of pixels are arranged in a ½ delta structure including one pixel of the plurality of pixels in a horizontal direction and two pixels of the plurality of pixels that are adjacent to each other in a vertical direction but are non-overlapping in the vertical direction,
    wherein only one of the two pixels adjacent to each other in the vertical direction is seen in one of the N number of views.

* * * * *